(12) United States Patent
Hahn et al.

(10) Patent No.: US 9,386,514 B2
(45) Date of Patent: Jul. 5, 2016

(54) HYBRID COMMUNICATION SYSTEM FOR SMARTPHONE/TABLET NETWORK

(71) Applicant: Raytheon Company, Waltham, MA (US)

(72) Inventors: Jiwon Hahn, Fullerton, CA (US); Stephen Wilder, Bellflower, CA (US); Mark Y. Ishii, Torrance, CA (US); Lawrence Young, Irvine, CA (US)

(73) Assignee: RAYTHEON COMPANY, Waltham, MA (US)

(*) Notice: Subject to any disclaimer, the term of this patent is extended or adjusted under 35 U.S.C. 154(b) by 240 days.

(21) Appl. No.: 13/660,405

(22) Filed: Oct. 25, 2012

(65) Prior Publication Data
US 2014/0120902 A1    May 1, 2014

(51) Int. Cl.
| H04M 1/00 | (2006.01) |
| H04W 48/18 | (2009.01) |
| H04W 88/06 | (2009.01) |
| H04W 36/14 | (2009.01) |
| H04W 84/12 | (2009.01) |
| H04W 64/00 | (2009.01) |

(Continued)

(52) U.S. Cl.
CPC ............. *H04W 48/18* (2013.01); *H04W 36/14* (2013.01); *H04W 64/00* (2013.01); *H04W 76/007* (2013.01); *H04W 76/02* (2013.01); *H04W 84/12* (2013.01); *H04W 88/06* (2013.01)

(58) Field of Classification Search
CPC ..... H04W 48/18; H04W 36/14; H04W 84/12; H04W 4/22; H04W 64/00; H04W 76/007; H04W 76/02; H04W 92/02; H04W 36/0066; H04W 68/12; H04W 8/245; H04W 16/14; H04W 88/16; H04W 88/06

USPC ............. 455/552.1, 436, 553.1, 426.1, 435.1, 455/445, 419, 432.1, 435.2, 439, 454, 418, 455/41.2, 453, 456.1, 502, 522; 370/331, 370/338, 328, 332
See application file for complete search history.

(56) References Cited

U.S. PATENT DOCUMENTS

| 5,327,478 A | 7/1994 | Lebowitz |
| 6,091,715 A | 7/2000 | Vucetic et al. |

(Continued)

FOREIGN PATENT DOCUMENTS

WO    WO9510911 A1    4/1995

OTHER PUBLICATIONS

Griffin Technology, "iTrip: The Original FM Transmitter," internet article, http://www.griffintechnology.com/itrip, retrieved on Aug. 31, 2012; pp. 1-3.

(Continued)

*Primary Examiner* — Fred Casca
(74) *Attorney, Agent, or Firm* — Cantor Colburn LLP

(57) ABSTRACT

A communication network and method of communication is disclosed. A server is coupled to a hybrid communication network that includes a radio frequency communication network and at least one other communication network. A communication device is configured for communication over the hybrid communication network. A mode of communication between the communication device and the server is selected. A message is then communicated over the hybrid communication network using the selected mode of communication. The communication device may be a smartphone coupled to a radio frequency transceiver and configured to drive the radio frequency transceiver.

16 Claims, 5 Drawing Sheets

(51) Int. Cl.
*H04W 76/00* (2009.01)
*H04W 76/02* (2009.01)

(56) References Cited

U.S. PATENT DOCUMENTS

| | | | |
|---|---|---|---|
| 6,680,923 | B1 | 1/2004 | Leon |
| 7,535,958 | B2 | 5/2009 | Best |
| 7,982,600 | B2 | 7/2011 | Gavrila et al. |
| 8,208,456 | B2 | 6/2012 | Helmersson et al. |
| 2003/0017845 | A1 | 1/2003 | Doviak et al. |
| 2005/0013264 | A1 | 1/2005 | Sundberg |
| 2005/0174468 | A1* | 8/2005 | Herranen ............ H04M 1/0264 348/340 |
| 2007/0121744 | A1 | 5/2007 | Zuckerman et al. |
| 2007/0124383 | A1 | 5/2007 | Hebert et al. |
| 2008/0137642 | A1 | 6/2008 | Teodosiu et al. |
| 2008/0244148 | A1* | 10/2008 | Nix, Jr. ............... H04L 41/0856 710/313 |
| 2009/0023450 | A1* | 1/2009 | George et al. ................ 455/442 |
| 2009/0310570 | A1* | 12/2009 | Smith ............................ 370/335 |
| 2011/0093836 | A1* | 4/2011 | Galicia et al. ................ 717/139 |
| 2011/0153442 | A1* | 6/2011 | Krampe ......................... 705/21 |
| 2012/0215938 | A1* | 8/2012 | Fletcher et al. ............... 709/238 |

OTHER PUBLICATIONS

Human Design Marketing Technology, "Online Radio Advertising Lesson 6: What if My Business Needs to Communicate During a Disaster?," May 24, 2012; internet article, http://humandmt.com/online-radio-advertising-lesson-6-smartphone-fm-radio-retrievers/; retrieved on Aug. 31, 2012; pp. 1-3.

International Search Report and Written Opinion dated Nov. 26, 2013 for International Application No. PCT/US2013/055247.

\* cited by examiner

HYBRID COMMUNICATION SYSTEM FOR SMARTPHONE/TABLET NETWORK

BACKGROUND

The present disclosure relates to communications and, more specifically, to a method for communicating over a hybrid communication network that includes a radio frequency network and at least one other communication network.

Smartphones and tablet computers rely on existing cellular networks and/or establishing a WiFi connection to a local network in order to establish communication. Increasingly, smartphones and tablets are being used in locations and situations in which cellular networks are non-existent or have poor connectivity. Exemplary situations may include military combat operations as well as catastrophic emergency situations, such as forest fires, flooding, hurricanes, tornados, and so on. In such challenging situations and environments, an alternative network for communication is needed.

SUMMARY

According to one embodiment of the present disclosure, a method of communication includes: coupling a server to a hybrid communication network that includes a radio frequency communication network and at least one other communication network; configuring a communication device for communication over the hybrid communication network; selecting a mode of communication between the communication device and the server; and communicating a message over the hybrid communication network using the selected mode of communication.

According to another embodiment, a communication network includes: a communication device configured to communicate over a radio frequency network and the at least one other communication network; and a server coupled to the radio frequency network and the at least one other communication network, the server configured to select a communication mode of the communication device.

According to another embodiment, a communication network includes: a hybrid network that includes a radio frequency network and at least one other communication network; a server coupled to the radio frequency network and the at least one other communication network; and an apparatus configured to communicate over the hybrid network, the apparatus comprising: a radio frequency transceiver configured to transmit and receive signals over the radio frequency network, and a communication device configured to drive the radio frequency transceiver and to communicate over the at least one other communication network.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
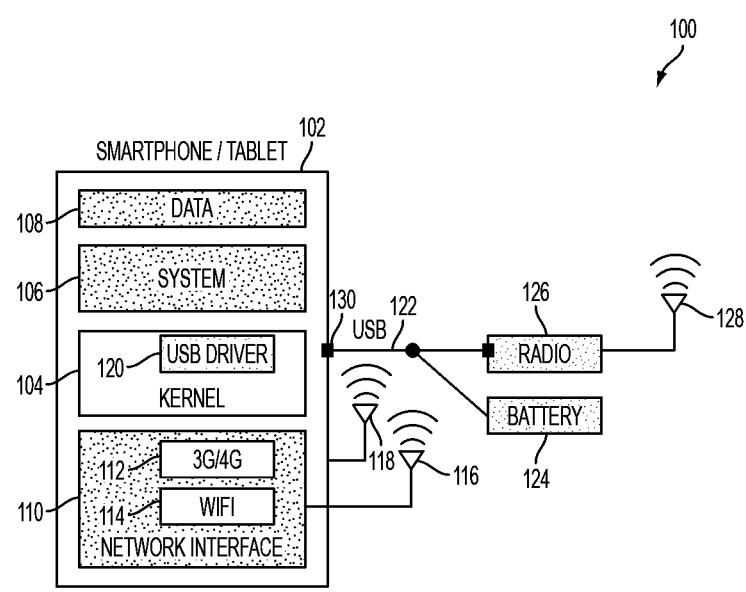
FIG. 1 shows an exemplary communication apparatus according to one embodiment of the present disclosure.

FIG. 1 shows an exemplary communication apparatus 100 in one embodiment of the present disclosure. The exemplary communication apparatus 100 includes a communication device 102 capable of at least one of communication over a cellular communication network or a WiFi network. The exemplary communication device 102 is a portable communication device and may include at least one of a cellular phone, a smartphone, and a tablet computer, such as an iPad®, among others. For illustrative purposes only, the communication device 102 is referred to herein as a smartphone 102. In one aspect, the exemplary smartphone 102 is capable of running applications or programs that may be stored in the smartphone 102. The applications or programs may perform communication functions such as voice communication, e-mail, text messaging, video communication, etc., as well as functions that are unrelated to communication, such as word processing, game playing, determining one's location, network browsing, etc.

The exemplary smartphone 102 includes a kernel 104 capable of running on a processor and memory of the smartphone 102 as well as for running various devices that may be removably coupled to the smartphone 102. The kernel 104 runs an operating system 106 of the smartphone 102 and any applications or programs that are run on the operating system 106. The exemplary smartphone 102 also includes and may store data 108, which may be text data, voice data, Global Positioning Satellite data, user settings, contacts and so forth. The smartphone 102 may further include a network interface 110 capable of establishing a communication path over one or more networks. In various embodiments, the network interface 110 may include a cellular network interface 112 that establishes communication over a cellular network such as a third generation (3G) cellular network or a fourth generation (4G) cellular network via cellular antenna 118. The network interface 110 may further or alternately include a WiFi interface 114 that establishes a wireless connection to a local base station via WiFi antenna 116. The network interface 110 of the smartphone 102 may further include additional interfaces to communication networks not specifically disclosed herein.

The communication apparatus 100 further includes a radio device 126 that is removably coupled to the smartphone 102. In exemplary embodiments, the radio device 126 may be a tactical radio or a radio for use by military, civil, or emergency response personnel for communication in the field. The radio device 126 includes a radio frequency (RF) antenna 128 and is capable of transmitting and receiving data via the RF antenna 128 over a radio frequency network. The radio device 126 may be coupled to the smartphone 102 via a Y-cable 122. The Y-cable 122 couples to the smartphone via an interface that may be a Universal Serial Bus (USB) interface 130 in one embodiment. The Y-cable 122 also couples to the radio device 126 and may further couple to a battery 124. The interface 130 is configured to place the smartphone 102 into a host mode when the Y-cable 122 is plugged into the smartphone 102. In particular the interface 130 includes at least an ID pin and a ground pin. A configuration of the ID pin permits distinction of whether the smartphone 102 operates in host mode or in slave mode. In an exemplary embodiment, when the Y-cable 122 is coupled to the smartphone 102, the smartphone 102 is placed in host mode when the ID pin is connected to ground and is placed in slave mode when the ID pin is not connected to the ground. In one aspect, smartphone 102 is coupled to the radio device 126 using Y-cable 122 wherein the ID pin of the Y-cable 122 is shorted to the ground pin. The smartphone 102 therefore operates in host mode, while the radio device 126 operates in slave mode. The smartphone 102 therefore may control a communication operation of the radio device 126 and use the radio device 126 to transmit and receive signals over a radio network.

Figure 2:
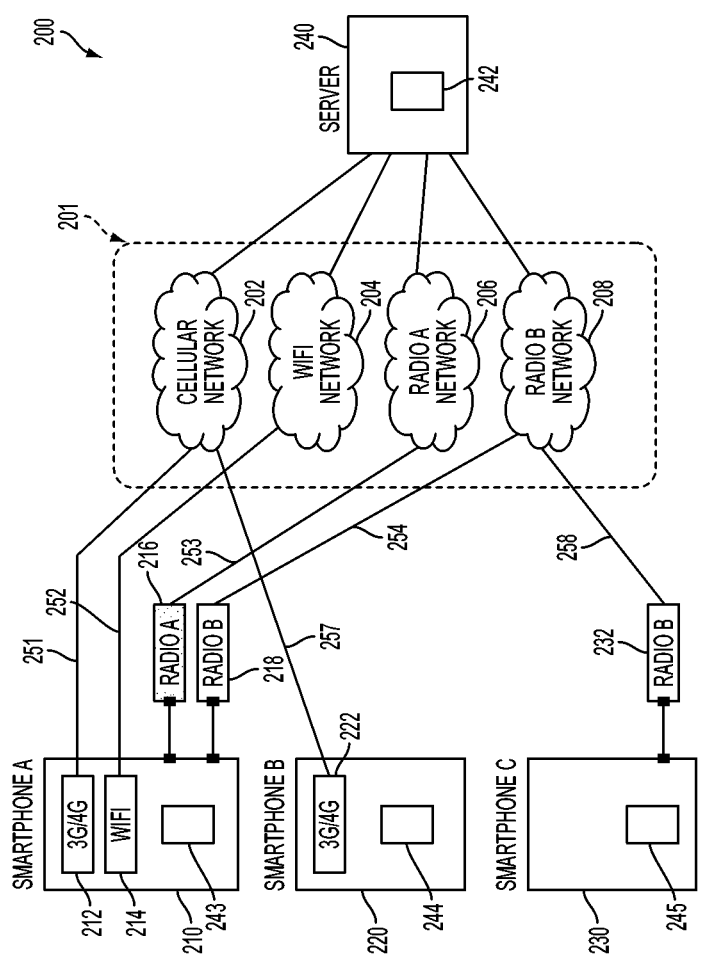
FIG. 2 shows an exemplary network capable of provide communication via the exemplary communication apparatus of FIG. 1.

FIG. 2 shows an exemplary network 200 capable of providing a communication path to the exemplary smartphone 102. In various embodiments, the exemplary network 200 is a hybrid network 201 that may include a cellular network 202, a WiFi network 204 and at least one radio network (i.e., Radio A network 206 and Radio B network 208). The hybrid network 201 need not include both the cellular network 202 and the WiFi network 204. Also shown are exemplary smartphones 210, 220 and 230 that are configured to communicate with each other over the hybrid network 201. Smartphone A includes a cellular interface 212 and a WiFi interface 214 and interfaces to Radio A 216 and Radio B 218. The interfaces to Radio A 216 and Radio B 218 may be established as shown in the exemplary configuration of FIG. 1. Smartphone B includes a cellular interface 222. Smartphone C includes an interface to Radio B 232. The interface to Radio B 232 may be established as shown in the exemplary configuration of FIG. 1.

The exemplary networks 202, 204, 206 and 208 of the hybrid network 201 may be coupled to a network server 240. In various embodiments, network server 240 monitors network traffic and forwards signals between networks. The network server 240 may include a routing table 242 and may select a communication route according to a selected criterion for signal transmission through the hybrid network 201. The routing table 242 may list the communication paths between particular network destinations, and in some cases, one or more metrics associated with the communication paths. The various metrics may include a quality of service parameter associated with the communication path. In various embodiments, the quality of service parameter may be one or more of an end-to-end latency, round trip time and a message completion rate. The router 242 may also include a quality criterion for the possible communication paths. The quality of service parameter of a selected communication path may be compared to the quality criterion in order to choose the selected communication path. The server 240 may forward a signal from one network to another network based on the comparison between quality criterion and the quality of service parameter.

As shown in FIG. 2, smartphone A 210 may transmit and receive signals to the hybrid network 201 via at least one of four configured communication paths: a cellular communication path 251, a WiFi communication path 252, a Radio A communication path 253 and a Radio B communication path 254. Smartphone B 220 transmits and receives signals via a cellular communication path 257. Smartphone C 230 transmits and receives signals via Radio B communication path 258. Thus, smartphone A 210 may communicate with smartphone B 220 using the cellular network 202 over communication paths 251 and 257. Smartphone A 210 may communicate with smartphone B 220 using Radio B Network 208 and communication paths 254 and 258. Smartphone A may also communicate with smartphone C 230 by sending a signal to any of the cellular network 202, the WiFi network 204, and the Radio A network 206 over communication paths 251, 252 and/or 253. While none of the cellular network 202, WiFi network 204 and Radio A network 206 has a direct communication path to smartphone C 230, the signal may be forwarded to network server 202. The network server 202 may select to route the signal from any of the cellular network 202, the WiFi network 204, and the Radio A network 206 to the Radio B network 208. The signal may then be communicated between the Radio B network 208 and smartphone C 230 over communication path 258 to complete a signal transmission from smartphone A 210 to smartphone C 230. Smartphone C 230 may send a signal to smartphone A 210 by reversing this order of the communication paths.

In various embodiments, the routing table 242 at server 240 is used to configure the communication path between any of the exemplary smartphones. In an alternate embodiment, a selected smartphone may include a routing table therein, such as exemplary routing tables 243, 244 and 245 of respective smartphone A (210), B (220) and C (230). The selected smartphone may therefore select a communication path for signal transmission between the selected smartphone and another smartphone or communication device on its own. The routing tables 243, 244 and 245 may be in communication with the routing table 242 and exchange information related to network quality and communication paths.

In various embodiments for communicating data, a smartphone may utilize at least two communication paths simultaneously by sending duplicate signals over the at least two communication paths. For example, smartphone A 210 may send duplicate signals, one over path 251 to cellular network 202 and one over path 253 to Radio A network 206. The signal may be filtered at one of the network server 240 and a receiving smartphone to remove the duplicate signals. In another embodiment, the smartphone may adaptively select a communication path for signal transmission and reception. In another embodiment, the signal may be split over a plurality of interfaces and communication paths and reassembled at the receiving smartphone, thereby enabling a maximum throughput of the signal through the hybrid network 201.

Figure 3:
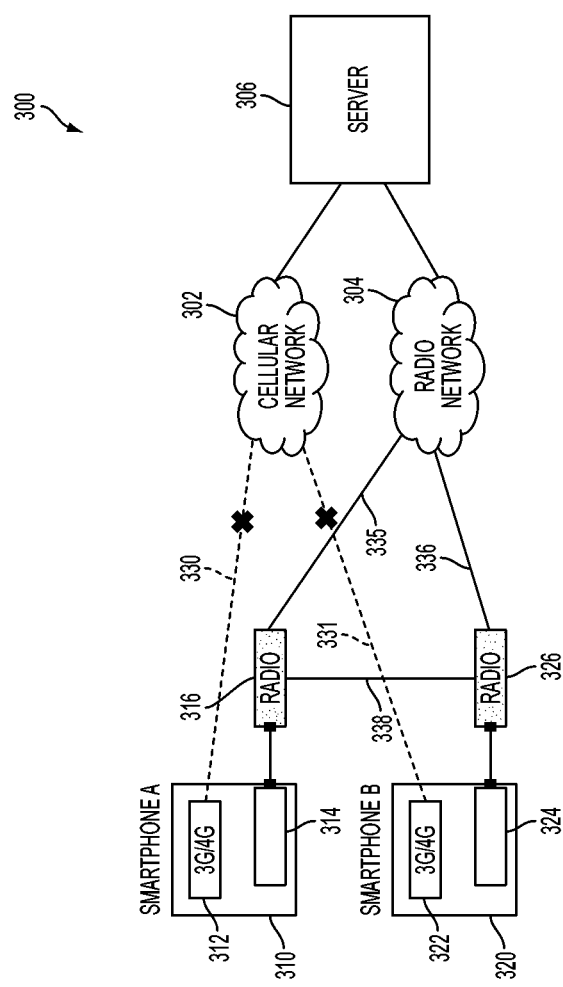
FIG. 3 shows an exemplary radio network communication path that may be established according to one embodiment.

FIG. 3 shows an exemplary communication network 300 that may be established according to one embodiment. The exemplary communication network 300 includes a cellular network 302 and a radio network 304 that are coupled to a server 306 that facilitates signal communication between the cellular network 302 and the radio network 304. The exemplary smartphone A 310 and exemplary smartphone B 320 use the communication network for communication purposes. Smartphone A 310 includes a cellular network interface 312 and a radio driver interface 314 coupled to radio device 316. Smartphone B 320 includes a cellular network interface 322 and a radio driver interface 324 coupled to radio device 326. Smartphone A 310 and smartphone B 320 are configured to drive their respective radio devices 316 and 326 to establish a radio frequency communication path. In the exemplary network 300, cellular communication paths 330 and 331 between smartphone A 310, smartphone B 320 and the cellular network have been severed, which may occur for various reasons. For example, a cell tower of the cellular network may be broken or destroyed due to emergencies such as flood, fire, etc. as well as due to military operations. The signal is thus re-routed to establish communication between smartphones A and B via communication paths 335 and 336 and the radio network 304. In addition, the radio devices 316 and 326 may establish a direct communication path 338 with each other, depending on their proximity to each other. Radio frequency communication therefore may further proceed without direct use of the radio network 304.

Figure 4:
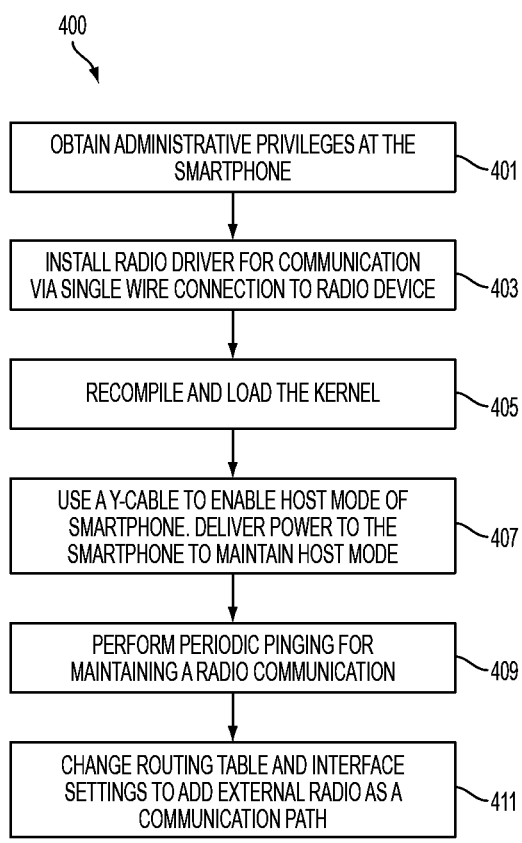
FIG. 4 shows a flowchart illustrating an exemplary method of preparing the exemplary communication apparatus of FIG. 1 for communication over the exemplary network of FIG. 2.

FIG. 4 shows a flowchart illustrating an exemplary method of configuring a smartphone to communicate over a radio network using an off-chip radio device, such as the exemplary radio device 126 of FIG. 1. In box 401, the operator of the smartphone obtains administrative privileges by unlocking the phone, installing a root program to enable administration capability, then logging on to his smartphone as an administrator. A driver program for driving the radio device via the Y-cable is installed at the smartphone in box 403. The driver program is installed into the kernel of the smartphone. In various embodiments, the driver program may be loaded into the smartphone via a connection to a computer or external processor. In box 405, the kernel having the driver program is compiled and loaded into the smartphone. In box 407, with the recompiled kernel now running, the smartphone is coupled to the radio device using a Y-cable having the pin configuration disclosed herein, i.e., the ID pin is shorted to ground. With the ID pin shorted, the smartphone is configured to operate in host mode. Additionally, a battery may be coupled to the smartphone to provide power to the smartphone. In box 409, the smartphone pings the radio device in order to confirm and/or maintain the radio communication. The smartphone may ping the radio device at other times during communication and not only upon connecting the smartphone to the radio device. In box 411, interface settings at a routing table of the smartphone are changed to include the external radio device as a communication path.

Figure 5:
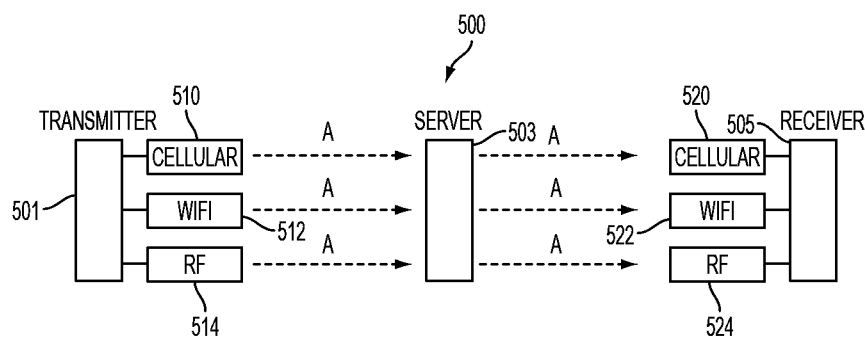
FIGS. 5-7 illustrate various modes of communication using the exemplary hybrid network of the present disclosure.

FIG. 5 illustrates an exemplary mode of communicating over an exemplary hybrid network of the present disclosure. An exemplary network 500 is shown that includes a server 503 that provides communication paths to one or more smartphones 501 and 505. For illustrative purposes smartphone 501 is a transmitter smartphone and smartphone 505 is a receiver smartphone. Alternatively, smartphone 501 may be a transmitter and smartphone 505 may be a transmitter, and during exemplary communications, each smartphone 501 and 505 may alternately serve as both transmitter and receiver. Transmitter smartphone 501 includes interfaces 510, 512 and 514 for providing communication, respectively, over cellular networks, WiFi networks and the exemplary radio frequency networks disclosed. Receiver smartphone 505 includes interfaces antennae 520, 522 and 524 for providing communication, respectively, over cellular networks, WiFi networks and the exemplary radio frequency networks disclosed. In the exemplary communication mode illustrated in FIG. 5, transmitter smartphone 501 communicates with the receiver smartphone 505 by sending a signal over each of the interfaces 510, 512 and 514 to the server 503. Each of the communication paths established by the interfaces 510, 512 and 514 carries the same signal, labeled as 'A' in FIG. 5. The server 503 receives the signals and filters the signals to reduce or remove duplicate signals. The filtering usually occurs at a message level rather than at a packet level or hardware level. Therefore, it is not necessary to modify pre-existing network protocols. Once the signals are received and filtered at the server 503, the server 503 creates new duplicates in order to ensure delivery to all receivers connected to various network interfaces, and sends the duplicates over communication paths to be received at interfaces 520, 522 and 524. The receiver smartphone 505 then filters the duplicates received from the server 503 to produce a signal at the receiver smartphone 505.

Figure 6:
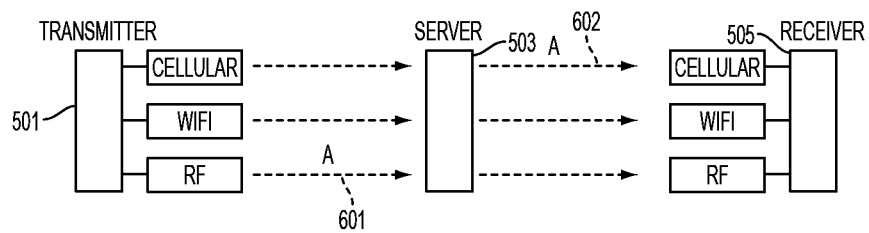

FIG. 6 illustrates an alternate mode of communicating over the exemplary hybrid network of the present disclosure. In the alternate communication mode, server 503 pings communication devices, such as smartphones 501 and 505, within its communication range. This may be done either on a regular basis or on a non-regular basis. The ping may be performed over some or all of the communication paths of the hybrid network. As a result of the pinging, the server 503 is able to compile and monitor various network parameters of the hybrid network, such as data round-trip time, data throughput, etc. Using this information, the server 503 may instruct the smartphone to use a selected communication network. For example, the server 503 may instruct the transmitter smartphone 501 to use the radio frequency communication path 601. The server 503 may also select a communication path, such as communication path 602, for relaying the signal to the receiver smartphone 505. In this communication mode, the receiver smartphone 505 may be listening to all of the communication networks for incoming signals. In one embodiment, the communication path 601 may be over a different network than the communication path 602, although the communication paths 601 and 602 may be over the same network.

Figure 7:
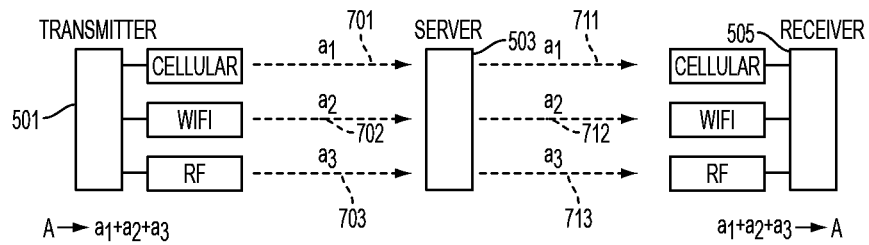

FIG. 7 illustrates yet another mode of communication over the exemplary hybrid network of the present disclosure. In this other communication mode, message A may be split into a plurality of smaller messages that are transmitted via messages streams. Each message stream may be sent over a different communication path. In FIG. 7, exemplary message A is split into exemplary message streams $a_1$, $a_2$ and $a_3$ that may be sent from the transmitter smartphone 501 to the server 503. For example, message stream $a_1$ may be sent over communication path 701, message stream $a_2$ may be sent over communication path 702 and message stream $a_3$ may be sent over communication path 703. In this mode of communication, the server 503 may forward the message streams $a_1$, $a_2$ and $a_3$ directly to the receiver smartphone 505. In an exemplary embodiment, message stream $a_1$ may be sent over communication path 711, message stream $a_2$ may be sent over communication path 712 and message stream $a_3$ may be sent over communication path 713. At the receiver smartphone, the message streams may be reassembled to form message A.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of communication, comprising:
providing a hybrid communication network that includes a radio frequency communication network operating at a radio frequency and at least one other communication network connected by a server;
connecting a removable tactical radio frequency transceiver to a mobile communication device by inserting an external cable into an external interface of the mobile communication device to configure the mobile communication device for communication over the hybrid communication network, wherein the external cable selects a mode of operation between the mobile communication device and the radio frequency transceiver;
selecting a mode of communication between the mobile communication device and the server;
using the mobile communication device to send a message to the hybrid communication network via the radio transceiver; and
using the server of the hybrid communication network to communicate the message to another communication device, wherein the mode of communication includes sending duplicates of the message from one of the mobile communication device and the server to the other communication device and the server over each of the radio frequency network and the at least one other communication network, and filtering the duplicated messages at the one of the other communication device and the server.

2. The method of claim 1, wherein the mobile communication device includes one of: a smartphone, a tablet computer, a communication device having a programmable kernel, a communication device capable of communicating over at least one of WiFi network and a cellular network.

3. The method of claim 1, further comprising compiling a kernel at the mobile communication device to enable the mobile communication device to drive the radio frequency transceiver.

4. The method of claim 1, wherein a pin configuration of the cable forces the mobile communication device into operating in one of: (i) a host mode; and (ii) a slave mode.

5. The method of claim 1, wherein the selected mode of communication includes using at least the radio frequency communication network.

6. The method of claim 1, wherein another mode of communication includes the server selecting a communication network from the radio frequency network and the at least one other communication network and instructing the mobile communication device to send the message over the selected communication network.

7. The method of claim 1, wherein another mode of communication includes splitting the message into a plurality of message streams, transmitting the plurality of message streams using the radio frequency communication network and the at least one other communication network, receiving the message streams and assembling the message streams to receive the message.

8. A communication network, comprising:
a radio frequency network operating over a radio frequency;
at least one other communication network;
a server coupled to the radio frequency network and the at least one other communication network, the server configured to select a communication mode of the communication network;
a mobile communication device configured to communicate over the at least one other communication network; and
a tactical radio removably coupled to an external interface of the mobile communication device via an external cable connection that selects a mode of operation between the tactical radio and the mobile communication device in order to configure the mobile communication device,
wherein the mobile communication device operates the radio transceiver to send a message to the radio frequency network via the radio transceiver and the server is further configured to communicate the message over the at least one other communication network to another communication device,
wherein a mode of communication is selected which includes sending duplicates of the message from one of the mobile communication device and the server to the other of the mobile communication device and the server over each of the radio frequency network and the at least one other communication network, and filtering the duplicated messages at one of the other communication device and the server.

9. The communication network of claim 8, wherein the mobile communication device is one of: a smartphone, a tablet computer, a communication device having a programmable kernel, a communication device capable of communication over at least one of a WiFi network and a cellular network.

10. The communication network of claim 8, wherein the mobile communication device is configured to communicate over the radio frequency network and the at least one other network simultaneously.

11. The communication network of claim 8, wherein the mode of communication includes at least one of:
(i) a mode in which:
 a. duplicates of a message are transmitted over each of the radio frequency network and the at least one other communication network from a transmitting communication device to the server,
 b. the server removes the duplicates by filtering to obtain a filtered message,
 c. the server creates duplicates of the filtered message and transmits the created duplicates over each of the radio frequency network and the at least one other communication network to a receiving communication device, and
 d. the receiving communication device filters the duplicates received from the server;
(ii) a mode in which the server selects a communication network from the radio frequency network and the at least one other communication network and instructs the communication device to transmit the message over the selected communication network; and (iii) a mode in which the message is split into a plurality of message streams, the plurality of message streams are transmitted and received over the radio frequency communication network and the at least one other communication network, and received message streams are assembled to form a received message.

12. The communication network of claim 8, wherein the mobile communication device is configured to select from the radio frequency network and the at least one other communication network.

13. A communication network, comprising:

a hybrid network that includes a radio frequency network operating in a tactical radio frequency and at least one other communication network;

a server coupled to the radio frequency network and the at least one other communication network; and an apparatus configured to communicate over the hybrid network, the apparatus comprising:

a mobile communication device configured for communication over the at least one other communication network, a tactical radio configured for communication over the radio frequency network, wherein the tactical radio is removably coupled to an external interface of the mobile communication device via an external cable that selects a mode of operation between the tactical radio and the mobile communication device, wherein the mobile communication device operates the radio transceiver to send a message to the radio frequency network via the radio transceiver and the server is further configured to communicate the message over the at least one other communication network, and another communication device;

wherein a mode of communication is selected which includes sending duplicates of the message from one of the mobile communication device and the server to the other of the mobile communication device and the server over each of the radio frequency network and the at least one other communication network, and filtering the duplicated messages at one of the other communication device and the server.

14. The network of claim 13, wherein the mobile communication device is one of: a smartphone, a tablet computer, a communication device having a programmable kernel, a communication device capable of communication over at least one of a WiFi network and a cellular network.

15. The network of claim 13, wherein one of the server and the mobile communication device is configured to select the radio frequency network for communication.

16. The method of claim 1, wherein the radio frequency device operates over a tactical radio frequency.

* * * * *